United States Patent
Wang

(10) Patent No.: US 9,821,599 B2
(45) Date of Patent: Nov. 21, 2017

(54) AUTOMOBILE WHEEL COVER

(71) Applicant: Yen-Ching Wang, Kaohsiung (TW)

(72) Inventor: Yen-Ching Wang, Kaohsiung (TW)

(*) Notice: Subject to any disclaimer, the term of this patent is extended or adjusted under 35 U.S.C. 154(b) by 0 days.

(21) Appl. No.: 15/084,455

(22) Filed: Mar. 29, 2016

(65) Prior Publication Data

US 2017/0282642 A1    Oct. 5, 2017

(51) Int. Cl.
| | |
|---|---|
| *B60B 7/06* | (2006.01) |
| *B60B 7/08* | (2006.01) |
| *B60B 7/00* | (2006.01) |
| *B60B 7/04* | (2006.01) |
| *B60B 7/14* | (2006.01) |

(52) U.S. Cl.
CPC .............. *B60B 7/08* (2013.01); *B60B 7/0013* (2013.01); *B60B 7/04* (2013.01); *B60B 7/066* (2013.01); *B60B 7/14* (2013.01)

(58) Field of Classification Search
CPC ........... B60B 7/08; B60B 7/06; B60B 7/0013; B60B 7/14; B60B 7/066; B60B 7/04; B60B 7/20
USPC ......... 301/37.26, 37.31, 37.32, 37.33, 37.34, 301/37.371, 37.35, 37.106, 37.38, 37.43
See application file for complete search history.

(56) References Cited

U.S. PATENT DOCUMENTS

| | | | | |
|---|---|---|---|---|
| 3,299,933 A | * | 1/1967 | Akashi | F16B 37/14 29/511 |
| 4,961,611 A | * | 10/1990 | Patti | B60B 7/14 301/37.38 |
| 4,998,780 A | * | 3/1991 | Eshler | B60B 7/04 301/108.4 |
| 5,112,112 A | * | 5/1992 | Baba | B60B 7/08 301/108.3 |
| 5,752,794 A | * | 5/1998 | Krawczak | F16B 37/14 301/108.4 |
| 5,803,552 A | * | 9/1998 | Kato | B60B 7/02 301/37.34 |
| 6,554,370 B2 | * | 4/2003 | Fowlkes | B60B 7/20 301/37.101 |

(Continued)

FOREIGN PATENT DOCUMENTS

| | | | | | |
|---|---|---|---|---|---|
| FR | 1198982 A | * | 12/1959 | ............. | F16B 21/16 |
| GB | 793465 A | * | 4/1958 | ............. | B60B 7/14 |
| WO | WO 9203301 A1 | * | 3/1992 | ............. | B60B 7/14 |

*Primary Examiner* — Kip T Kotter
*Assistant Examiner* — Scott A Browne
(74) *Attorney, Agent, or Firm* — Raymond Y. Chan; David and Raymond Patent Firm

(57) ABSTRACT

An automobile wheel cover includes a central hole, an adjusting block, a threaded element, and integrally formed with a bearing seat opposite an inner side of the central hole. An annular seat is extended from an inner side of the bearing seat and is defined with a plurality of slots, between each two slots is provided an elastic post. The adjusting block has a small diameter end and a large diameter end and is inserted in the annular seat via the small diameter end. The threaded element is threaded in the adjusting block via the bearing seat. Thereby, when screwing the threaded element, the large diameter end of the adjusting block moves in the annular seat to make the posts expanded outwardly and abutted against the shaft hole, which can apply to the automobile rims with different hole diameters and prevent the automobile wheel cover falling from the automobile rim.

4 Claims, 7 Drawing Sheets

(56) References Cited

U.S. PATENT DOCUMENTS

| | | | | |
|---|---|---|---|---|
| 6,776,458 | B1* | 8/2004 | Wang | B60B 7/006 |
| | | | | 301/108.1 |
| 6,969,124 | B2* | 11/2005 | Gerard | B60B 7/0013 |
| | | | | 301/108.1 |
| 7,014,273 | B1* | 3/2006 | Yang | B60B 7/20 |
| | | | | 301/37.109 |
| 7,416,260 | B1* | 8/2008 | Cuevas | B60B 7/08 |
| | | | | 301/37.106 |
| 2002/0079735 | A1* | 6/2002 | Hazelwood | B60B 7/04 |
| | | | | 301/37.38 |
| 2005/0073191 | A1* | 4/2005 | Gerard | B60B 5/02 |
| | | | | 301/37.101 |
| 2005/0151414 | A1* | 7/2005 | Hauler | B60B 7/04 |
| | | | | 301/108.4 |
| 2006/0181139 | A1* | 8/2006 | Nilsen | B60B 3/16 |
| | | | | 301/37.374 |
| 2013/0015698 | A1* | 1/2013 | Butler | B60B 7/0013 |
| | | | | 301/37.29 |
| 2014/0152079 | A1* | 6/2014 | Vickers | B60B 7/08 |
| | | | | 301/37.102 |

\* cited by examiner

AUTOMOBILE WHEEL COVER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an automobile wheel cover, and more particularly to an automobile wheel cover which can be adjusted to be abutted against a shaft hole of an automobile rim according to the shaft hole diameter.

Description of Related Arts

Conventional automobile rims are usually provided with a wheel cover on an outer side thereof to enhance the visual effect and protect the automobile rim, and although no law banning installation requirement of automobile wheel cover at present, based on security reasons, the wheel cover can not fall from the automobile during driving, which is actually the most basic requirement.

The current automobile wheel cover is usually provided with a plurality of engaging legs (such as, metal engaging legs or plastic engaging legs) in a periphery of an inner surface thereof for engaging in a plurality of holes in the automobile rim (such as, the structures disclosed in Taiwan Patent Publication Nos. M262380, M271743, M394921, and automobile rims in the industry also known as automobile steel rims), however, in practice, no matter what kind of engaging leg is used, the wheel cover cannot be fitted tightly since the shapes of the holes of the automobile rims of different brands have some dimensional tolerances. Although the user cannot see the sealing defect from the appearance, when driving at high speed and encountering uneven road, the wheel cover will likely to be fallen from the automobile, which is insecure.

In addition, as shown in FIG. 1, in a center of an automobile rim 10 is defined a shaft hole 101, a plurality of engaging legs 201 of a cover 20 with a brand is engaged in the shaft hole 101, if an automobile wheel cover is assembled to the automobile rim 10, the wheel cover will cover the cover 20, so there is a need for improvement.

The present invention has arisen to mitigate and/or obviate the afore-described disadvantages.

SUMMARY OF THE PRESENT INVENTION

The primary objective of the present invention is to provide an automobile wheel cover that can solve the assembly defects of the existing automobile wheel cover and automobile rim.

To achieve the objective of the present invention, the automobile wheel cover in accordance with the present invention is defined with a central hole and is integrally formed with a bearing seat opposite an inner side of the central hole. An annular seat is extended from an inner side of the bearing seat and is defined with a plurality of slots, and between each two slots is provided an elastic post. The automobile wheel cover is provided with an adjusting block and a threaded element. Both sides of the adjusting block are a small diameter end and a large diameter end. The adjusting block is inserted in the annular seat via the small diameter end. The threaded element is threaded in the adjusting block via the bearing seat. When screwing the threaded element, the adjusting block can move in the annular seat, and the large diameter end will make the posts expand outwardly. Thereby, when the annular seat of the automobile wheel cover is inserted in a shaft hole of an automobile rim, and the threaded element is threaded to make the posts expanded outwardly and abutted against the shaft hole, the automobile wheel cover can be assembled to the automobile rim stably.

A lateral side of the adjusting block is defined with at least one engaging portion for engaging in the slot, so as to fix the adjusting block.

Between the bearing seat and an inner periphery of the central hole is equidistantly defined a plurality of separating holes. A cover is inserted in the central hole and is equidistantly and annularly provided with a plurality of engaging legs in an inner side thereof, the engaging legs are engaged in the separating holes, such that the cover will be assembled in the central hole of the automobile wheel cover.

A protruded ring is inwardly extended from the inner side of the central hole, a plurality of protruded seats is outwardly extended from an outer side of the bearing seat and is connected to the protruded ring, such that the separating holes are formed between the protruded seats. In addition, the engaging legs are received in the separating holes and are engaged with the protruded ring.

In summary, the automobile wheel cover is provided with the bearing seat, the annular seat and the adjusting block, the annular seat has the plurality of elastic posts and is inserted in the shaft hole of the automobile rim, the adjusting block is inserted in the annular seat via the small diameter end, and the threaded element is threaded in the adjusting block via the bearing seat. Thereby, when screwing the threaded element, the large diameter end of the adjusting block will move in the annular seat to make the posts expanded outwardly and abutted against the shaft hole, which can not only improve the stability of assembling the automobile wheel cover to the automobile rim, but also can apply to the automobile rims with different hole diameters.

Moreover, between the bearing seat and the inner periphery of the central hole is equidistantly defined the plurality of separating holes, and the engaging legs of the cover that is printed with the brand are engaged in the separating holes, such that the cover will be assembled in the central hole of the automobile wheel cover.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENT

Figure 1:
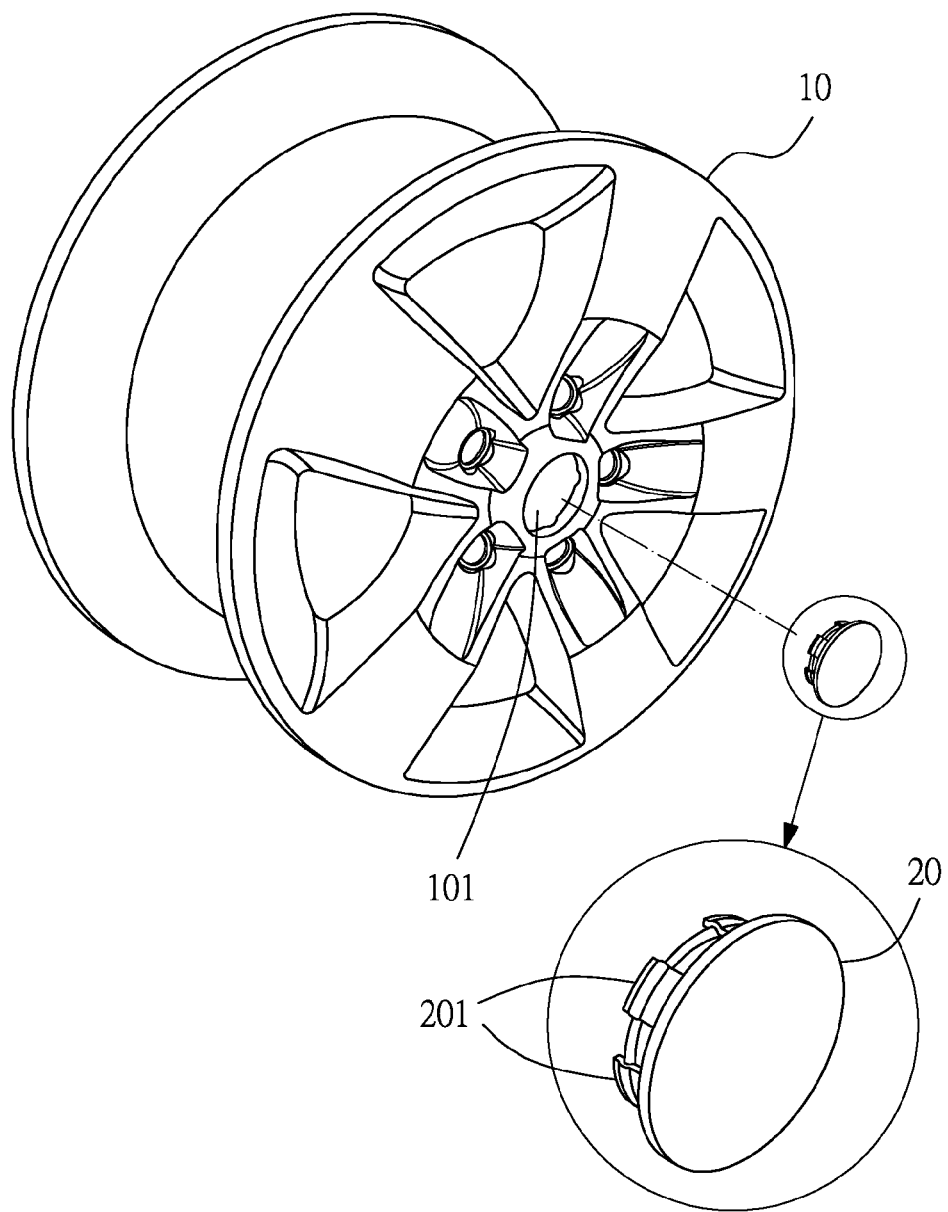
FIG. 1 is an exploded view of conventional automobile rim and cover.
Figure 2:
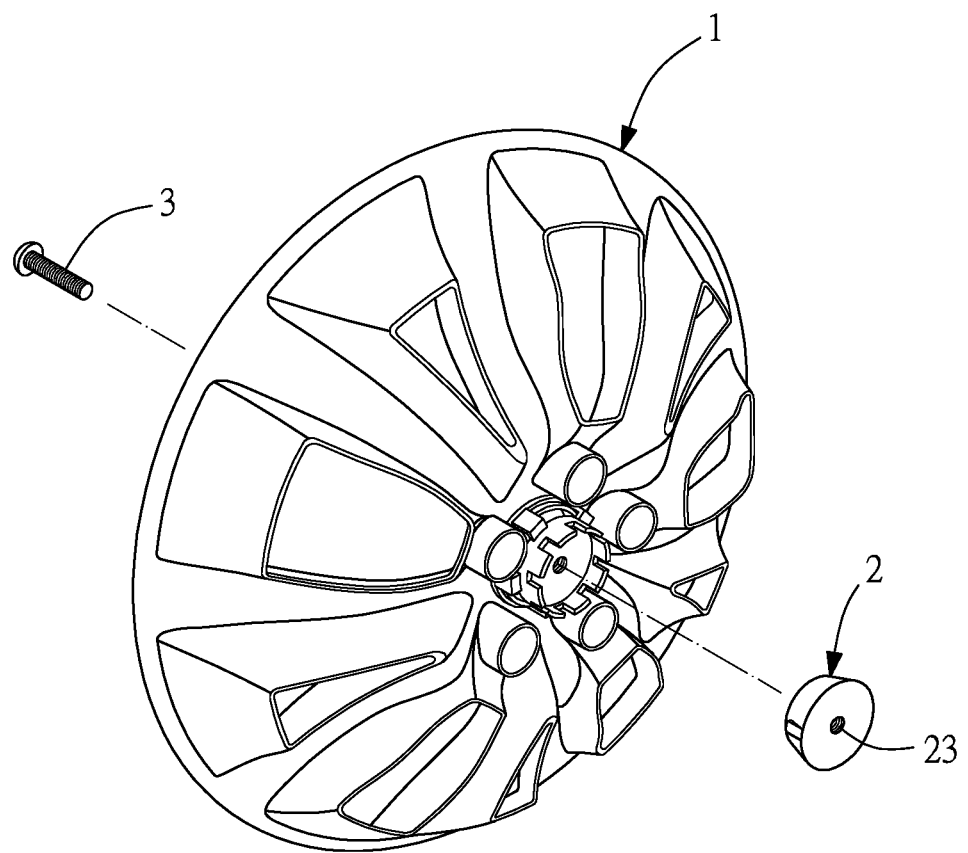
FIG. 2 is an exploded view of an automobile wheel cover in accordance with the present invention.

Referring to FIG. 2, an automobile wheel cover 1 in accordance with the present invention comprises an adjusting block 2 and a threaded element 3.

Figure 3:
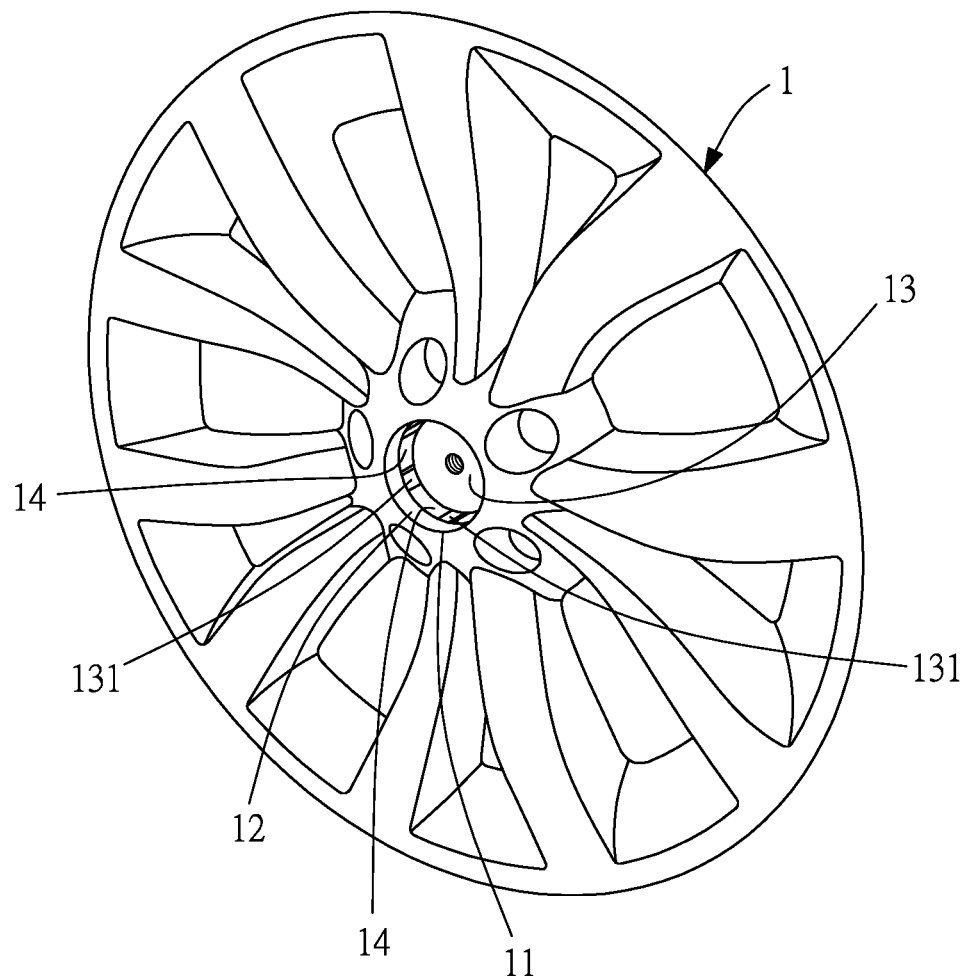
FIG. 3 is a front perspective view of the automobile wheel cover in accordance with the present invention.

Referring to FIG. 3, the automobile wheel cover 1 is made of plastic and is defined with a central hole 11, a protruded ring 12 is inwardly extended from an inner side of the central hole 11. The automobile wheel cover 1 is integrally formed with a bearing seat 13 opposite the inner side of the central hole 11, and between the bearing seat 13 and an inner periphery of the central hole 11 is equidistantly defined a plurality of separating holes 14. Further referring to FIG. 4, a plurality of protruded seats 131 is outwardly extended from an outer side of the bearing seat 13 and is connected to the protruded ring 12, such that the separating holes 14 are formed between the protruded seats 131. An annular seat 15 is extended from an inner side of the bearing seat 13 and is defined with a plurality of slots 151, and between each two slots 151 is provided an elastic post 152.

Figure 4:
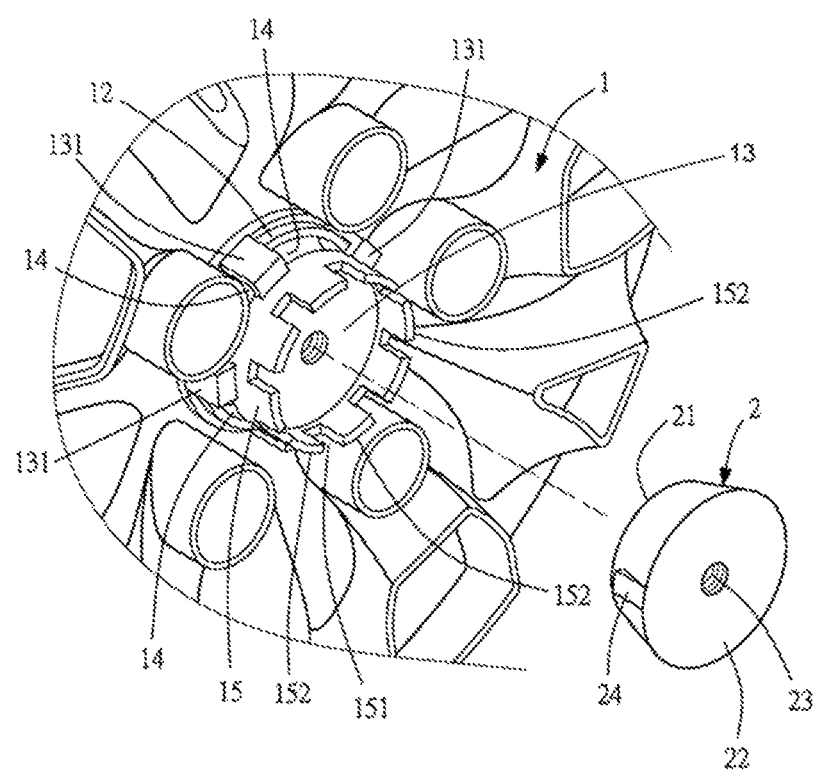
FIG. 4 is a back perspective view of main components of the automobile wheel cover in accordance with the present invention.

The adjusting block 2 is made of plastic and both sides are a small diameter end 21 and a large diameter end 22 (as shown in FIG. 4), that is, the adjusting block 2 is inclined. The adjusting block 2 is defined with a penetrating threaded hole 23 in a center thereof and is inserted in the annular seat 15 via the small diameter end 21. A lateral side of the adjusting block 2 is defined with at least one engaging portion 24 (in the figure, only one engaging portion is taken for example) for engaging in the slot 151 (as shown in FIG. 5), so as to fix the adjusting block 2.

Figure 5:
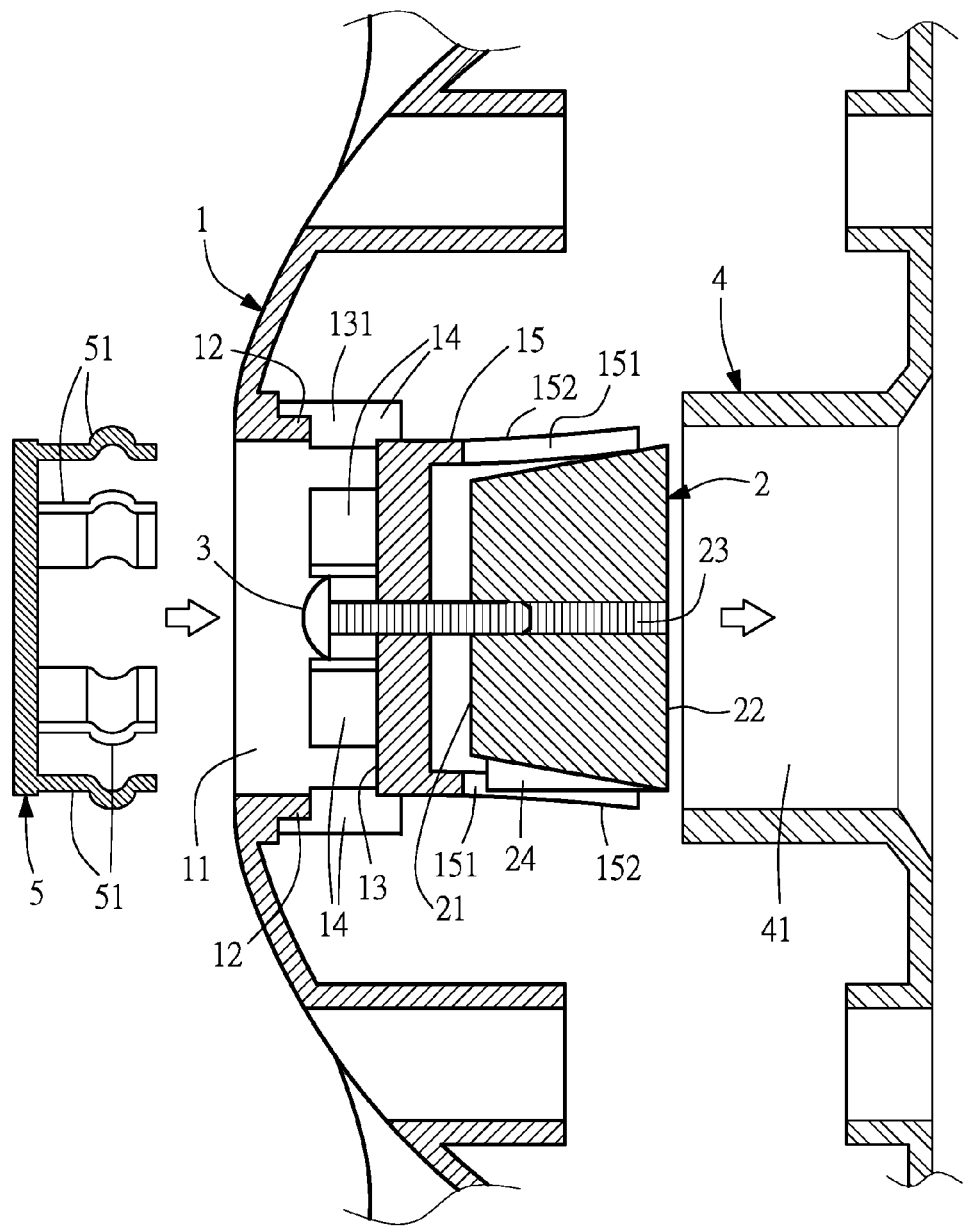
FIG. 5 is a plan view of the composite structure of the main components of the automobile wheel cover in accordance with the present invention.
Figure 6:
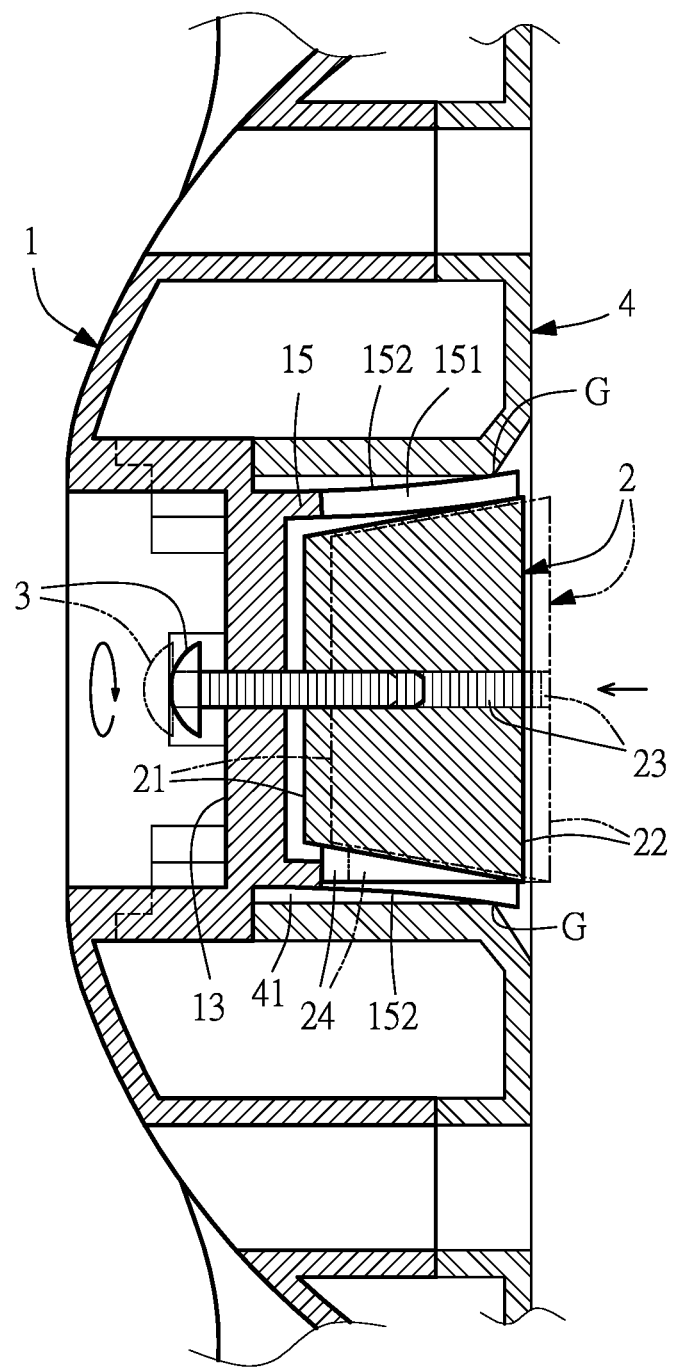
FIG. 6 is an operational view of the main components of the automobile wheel cover in accordance with the present invention.

Referring to FIG. 5, the threaded element 3 is threaded in the threaded hole 23 of the adjusting block 2 via the bearing seat 13. When screwing the threaded element 3, the adjusting block 2 can move in the annular seat 15 (as shown in FIG. 6), and the large diameter end 22 will make the posts 152 expand outwardly. When releasing the threaded element 3, the adjusting block 2 can move reversely, at that time, the posts 152 will be restored to their original positions without the force of the large diameter end 22.

Figure 7:
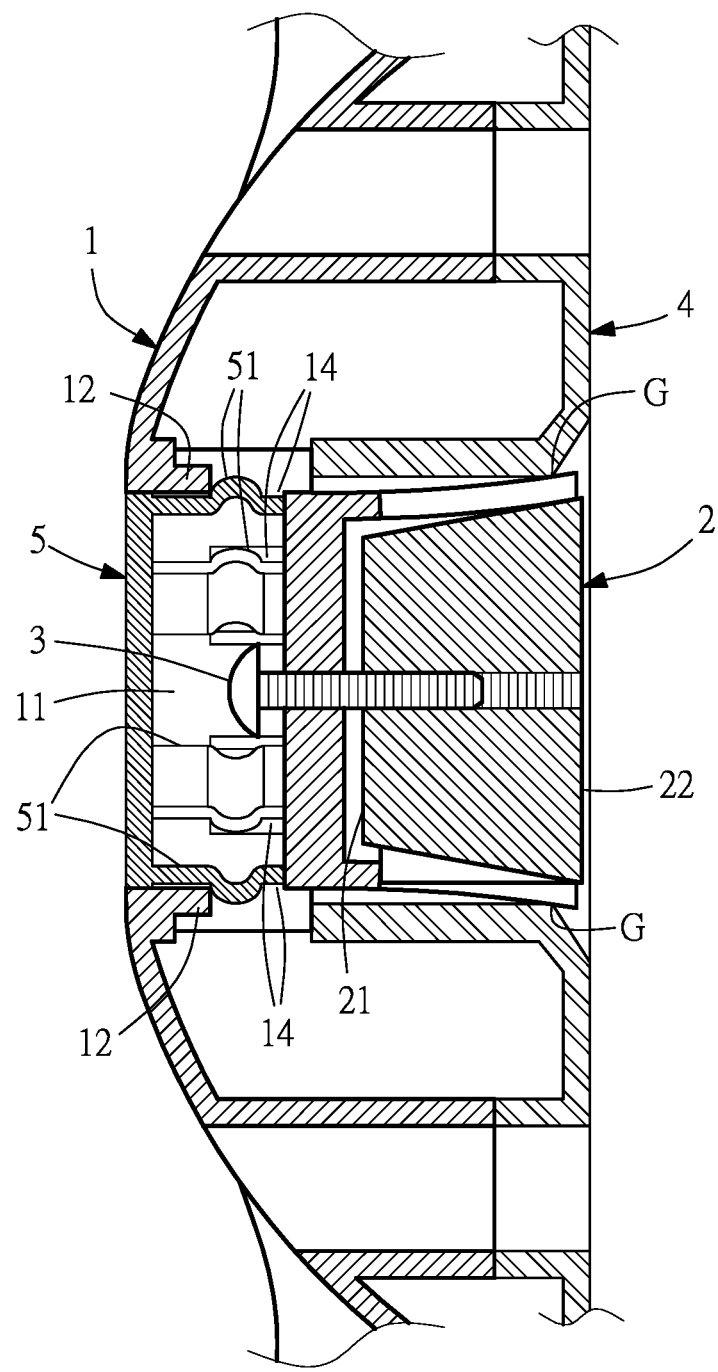
FIG. 7 is a plan view of the main components being assembled with a cover.

When assembling, the annular seat 15 of the automobile wheel cover 1 is firstly inserted in a shaft hole 41 of an automobile rim 4 (as shown in FIGS. 5-6), and then the threaded element 3 is threaded to make the posts 152 expanded outwardly and abutted against an inner wall of the shaft hole 41, and the posts 152 can even be abutted against an inside corner of the shaft hole 41 (referring to point G as shown in FIGS. 6-7), which can not only improve the stability of assembling the automobile wheel cover 1 to the automobile rim 4, but also can apply to the automobile rims 4 with different hole diameters (that is, different brands). Moreover, the automobile wheel cover 1 can be assembled to the automobile rim 4 tightly only by screwing or releasing the threaded element 3 to move the adjusting block 2 in or out, so as to prevent the automobile wheel cover 1 falling from the automobile rim 4, thus improving the driving safety.

Further referring to FIGS. 5 and 7, a cover 5 is inserted in the central hole 11 and is equidistantly and annularly provided with a plurality of engaging legs 51 in an inner side thereof, the engaging legs 51 are engaged in the separating holes 14, such that the cover 5 will be assembled in the central hole 11 of the automobile wheel cover 1. In addition, the engaging legs 51 are received in the separating holes 14 and are engaged with the protruded ring 12.

It will be seen from the above-mentioned descriptions that the automobile wheel cover 1 of the prevent invention overcomes the tolerance problem of the shaft holes 41 of the automobile rims 4 of different brands, and will not be fallen from the automobile rim 4, which can improve the driving safety. Moreover, since the cover 5 printed with the brand is engaged in the central hole 11 of the automobile wheel cover 1, which can also improve the existing shortcomings.

While we have shown and described various embodiments in accordance with the present invention, it should be clear to those skilled in the art that further embodiments may be made without departing from the scope of the present invention.

What is claimed is:

1. An automobile wheel cover having a central hole, wherein the automobile wheel cover is integrally formed with a bearing seat disposed in the central hole, wherein the automobile wheel cover comprises an annular seat extended from an inner side of the bearing seat and defined with a plurality of slots, between each two slots is provided an elastic post, wherein the automobile wheel cover is further provided with an adjusting block and a threaded element, the adjusting block having two sides and the two sides of the adjusting block having a small diameter end and a large diameter end respectively, the small diameter end of the adjusting block being inserted in the annular seat, the threaded element being threaded in the adjusting block by passing through the bearing seat, when screwing the threaded element, the adjusting block moves in the annular seat, and the large diameter end makes the posts expand outwardly.

2. The automobile wheel cover, as claimed in claim 1, wherein a lateral side of the adjusting block is defined with at least one engaging portion for engaging in the slot.

3. The automobile wheel cover, as claimed in claim 2, wherein between the bearing seat and an inner periphery of the central hole, a plurality of separating holes is equidistantly defined, wherein a cover is inserted in the central hole and is equidistantly and annularly provided with a plurality of engaging legs in an inner side thereof, and the engaging legs are engaged in the separating holes.

4. The automobile wheel cover, as claimed in claim 3, wherein a protruded ring is inwardly extended from the inner side of the central hole, wherein a plurality of protruded seats are outwardly extended from an outer side of the bearing seat and are connected to the protruded ring, such that the separating holes are formed between the protruded seats, wherein the engaging legs are received in the separating holes and are engaged with the protruded ring.

* * * * *